1,871,800

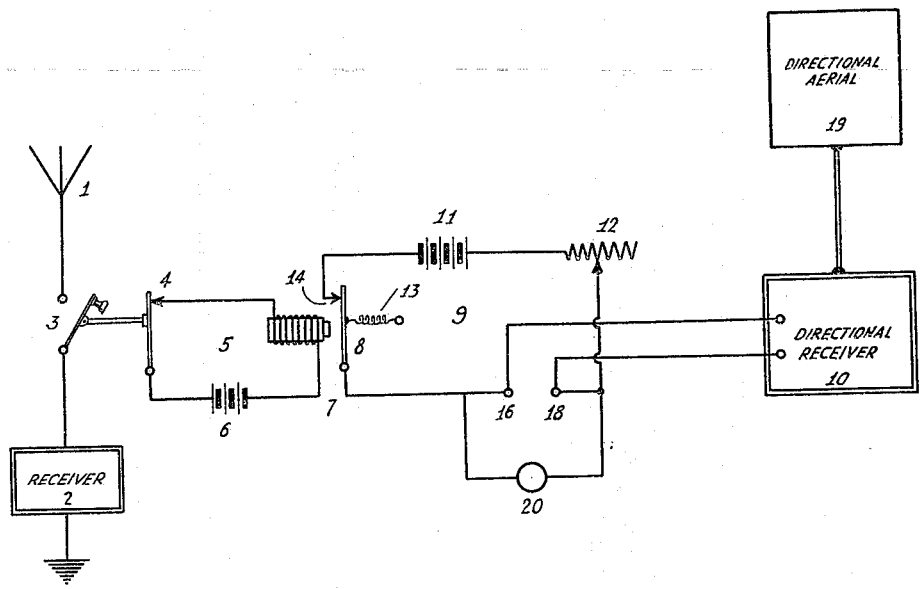
Aug. 16, 1932.     F. H. KROGER     1,871,800
INTERLOCKING APPARATUS FOR DIRECTION FINDERS
Filed May 25, 1929
INVENTOR
FRED H. KROGER
ATTORNEY Patented Aug. 16, 1932

UNITED STATES PATENT OFFICE

FRED H. KROGER, OF RIDGEWOOD, NEW JERSEY, ASSIGNOR TO RADIO CORPORATION OF AMERICA, A CORPORATION OF DELAWARE

INTERLOCKING APPARATUS FOR DIRECTION FINDERS

Application filed May 25, 1929. Serial No. 365,865.

In direction finding it is well known that to obtain true pointing readings by means of a directional aerial it is necessary that the electrical conditions adjacent the directional aerial are the same or as near the same as possible at all times otherwise the directional aerial may indicate the direction of the station as being at one position under one set of conditions and in another position under another set of conditions. This could easily lead to serious results especially where the directions indicated by the receiver are relied on for navigation.

Especially are the above pointing errors inherent in direction finding apparatus utilized on aircraft or ships where the apparatus is located in proximity to numerous conductors, as for instance, the open aerial utilized in receiving signals on the receiving apparatus other than the direction finding receiver, masts, guy wires, metallic structures, etc. The last named conductors do not vary in effect on the direction finder, and one compensated for need not be considered.

However, if the open aerial is connected to ground when the direction finder is used the direction of a certain station will be different than when readings are taken with the open aerial disconnected with respect to ground.

It has been found by practice that to have the ship's open or vertical aerial open, that is disconnected, with respect to ground the directions obtained by means of the directive aerial are more satisfactory in that they more accurately designate the true position of the source of signal energy being received. Accordingly, some device is necessary whereby the operator of the directional receiver can be assured that the open aerial used adjacent the receiver will be disconnected with respect to ground at all times when the directional receiver is used.

Heretofore, schemes have been used in which a light in the navigator's room and the radio room is lit if and when the open aerial is disconnected with respect to ground. Obviously this arrangement has various drawbacks, as for instance, the navigator must in all cases observe the lights before readings are taken on the directional aerial. Furthermore, it is obvious that one or both of the lights could fail and the navigator take incorrect readings over a considerable period of time before the failure of the indicating lamps became apparent. This, as will be seen, might result in serious consequences if the ship or airship was relying entirely on the directional signals for navigation.

Briefly and broadly, the primary object of this invention is to provide a novel though simple arrangement whereby all of the advantages of heretofore known devices may be obtained and all of the disadvantages attending on heretofore known devices may be obviated.

According to the present invention a relay is so arranged with respect to the filament heating circuit of the direction finder receiver apparatus and the open aerial that the receiver cannot be operated unless the open aerial is disconnected with respect to ground.

This is accomplished by connecting a switch in the aerial to a contact in a relay circuit adapted to close the filament heating circuit of the receiver, in such a manner that said circuit is closed only when the switch in the aerial is in the open position.

Various objects and advantages will become apparent from the following specification and therefrom when read in connection with the attached drawing in which the single figure shows the at present preferred form of my invention.

Referring in particular to the drawing, 1 is a vertical or open aerial connected through receiver 2 to ground. This receiver and aerial are to be used in obtaining signals other than signals indicating the direction of the sending station. A switch 3 in the vertical aerial is connected to a contact 4 in a relay circuit 5 in such a manner that the relay circuit 5 is closed only when switch 2 is in the open position. A battery 6 energizes relay circuit 5 when the circuit is completed by means of the switch 4 in the vertical aerial. Relay circuit 5 includes the winding 6 of a magnet 7, the armature 8 of which is included in the circuit 9 which includes the filament of the thermionic tubes used in the directional receiver 10. A battery 11 connected in series with a variable resistance 12 is provided to supply energizing current to the filaments of the thermionic tubes in the receiver only when the armatures 8 spring bias by a spring 13 is actuated by winding 6 to close the contact at 9 thereby completing the filament circuit for the tubes in the directional receiver. Winding 7 is energized as pointed out before only when the switch 2 in a vertical aerial is in an open position. The circuit for the filaments of the tubes used in directional receiver 10 indicated diagrammatically in the drawing is connected to a pair of contacts 16 and 18 thus including said filaments in circuit 9. A directional aerial 19 of any known type is connected to receiver 10 which itself may be of any known type of directional receiver in use at the present time. The receiver 10 may or may not include radio frequency amplifiers and/or audio frequency amplifiers, the nature of the receiver and amplifiers depending on the conditions under which it is used. A voltmeter 20 is connected across between contacts 16 and 18 and serves as to indicate the fact that the switch 3 is open, and also the value of the voltage being applied to the tubes of receiver 10.

In apparatus arranged in accordance with my invention the navigator does not need to rely on observing lights to know whether or not signals obtained are obtained under the proper conditions. In this apparatus the lighting of the filaments, the reception of signals and the reading of meter 20 all indicate correct operation of the apparatus.

Although for purposes of illustration I have shown the at present preferred form of my invention and set forth the operation thereof, I do not wish to limit myself thereby except as marked out in the claims hereto appended.

Claims:

1. Interlocking apparatus for use with radio installations, comprising radio signalling apparatus having a conductor adapted to cause energy interchange with a natural medium and directional receiving apparatus including a nonuniform absorption member inherently subject to pointing errors resulting from distorted signal energy, to insure that the signalling apparatus does not cause incorrect signals to be taken on the direction finder comprising, the combination of a thermionic receiver adapted to be connected with said nonuniform absorption member, an energizing circuit for said receiver, said circuit including a switch biased to open circuit position, a switch in the conductor of said signalling apparatus, a relay circuit, a switch in said relay circuit, a link connecting said last named switch to the switch in said conductor, and an operative connection between said relay and the switch in said energizing circuit.

2. Interlocking apparatus for use with radio installations, comprising radio signalling apparatus having a conductor adapted to cause energy interchange with the surrounding natural medium and directional receiving apparatus including a frame aerial system inherently subject to direction indicating errors resulting from the action of said conductor on the signal wave approaching said frame aerial system, to insure that correct signals will be taken on the directional receiving apparatus comprising, the combination of a thermionic receiver adapted to be energized by said frame aerial system, an energizing circuit for the tubes in said receiver, said circuit including a switch normally spring biased to an open circuit position, a switch connected between said conductor and ground or counterpoise, a relay circuit including a magnetic winding a source of potential and a switch, a link connecting said last named switch to the switch connecting said conductor to ground, an armature associated with said magnetic winding, and a connection between said armature and the switch in said energizing circuit.

FRED H. KROGER.